No. 680,069. Patented Aug. 6, 1901.
E. PISKO & J. PHILIPPI.
CIGAR OR CIGARETTE MAKING MACHINE.
(Application filed Oct. 13, 1898. Renewed Jan. 23, 1901.)

(No Model.) 7 Sheets—Sheet 1.

No. 680,069. Patented Aug. 6, 1901.
E. PISKO & J. PHILIPPI.
CIGAR OR CIGARETTE MAKING MACHINE.
(Application filed Oct. 13, 1898. Renewed Jan. 23, 1901.)

(No Model.) 7 Sheets—Sheet 3.

No. 680,069. Patented Aug. 6, 1901.
E. PISKO & J. PHILIPPI.
CIGAR OR CIGARETTE MAKING MACHINE.
(Application filed Oct. 13, 1898. Renewed Jan. 23, 1901.)
(No Model.) 7 Sheets—Sheet 4.

No. 680,069.  
E. PISKO & J. PHILIPPI.  
Patented Aug. 6, 1901.  
CIGAR OR CIGARETTE MAKING MACHINE.  
(Application filed Oct. 13, 1898. Renewed Jan. 23, 1901.)  
(No Model.)  
7 Sheets—Sheet 5.

WITNESS

INVENTORS

BY

ATTORNEYS

No. 680,069. Patented Aug. 6, 1901.
E. PISKO & J. PHILIPPI.
CIGAR OR CIGARETTE MAKING MACHINE.
(Application filed Oct. 13, 1898. Renewed Jan. 23, 1901.)
(No Model.) 7 Sheets—Sheet 6.

WITNESS
INVENTORS.
ATTORNEYS

No. 680,069. Patented Aug. 6, 1901.
E. PISKO & J. PHILIPPI.
CIGAR OR CIGARETTE MAKING MACHINE.
(Application filed Oct. 13, 1898. Renewed Jan. 23, 1901.)

(No Model.) 7 Sheets—Sheet 7.

Fig. 16.

WITNESS
INVENTORS
BY
ATTORNEYS

UNITED STATES PATENT OFFICE.

EMANUEL PISKO AND JACOB PHILIPPI, OF NEW YORK, N. Y.

CIGAR OR CIGARETTE MAKING MACHINE.

SPECIFICATION forming part of Letters Patent No. 680,069, dated August 6, 1901.

Application filed October 13, 1898. Renewed January 23, 1901. Serial No. 44,466. (No model.)

*To all whom it may concern:*

Be it known that we, EMANUEL PISKO and JACOB PHILIPPI, citizens of the United States, and residents of New York, in the county of New York and State of New York, have invented certain new and useful Improvements in Cigar or Cigarette Making Machines, of which the following is a specification.

The object of our invention is to provide means for automatically rolling and shaping cigars or cigarettes.

In the drawings forming part of this specification.

1 is the frame of the machine, which is made or cast in any suitable way. Across the frame of the machine runs a shaft 2, carrying at one end a pulley 3, by which power is communicated to the machine. This shaft is provided with a clutch 4, of any suitable or desired construction, by which the machine may be stopped or started at will. Said shaft also carries a small gear-wheel 5. Below shaft 2 is a second shaft 6, which carries a gear-wheel 7, said gear-wheel meshing with the gear-wheel 5, above mentioned. This shaft has fixed to rotate therewith an arm 8, carrying at its end a roller 9. The shaft also carries a grooved cam 10. At the other end the shaft carries a sprocket-wheel 11 and next to the sprocket-wheel and fixed to rotate with the shaft an arm 12, carrying a roller 13.

Figure 2:
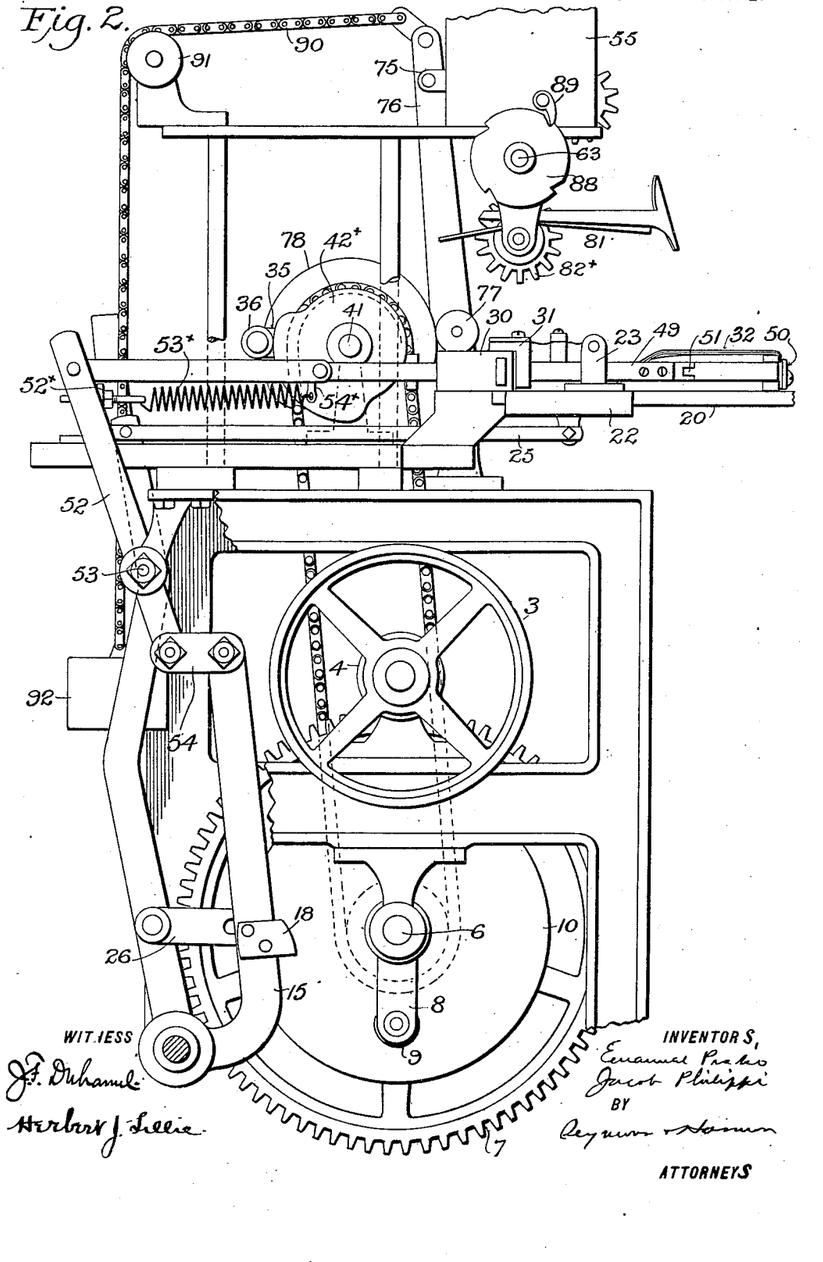
Fig. 2 is a view in elevation of the left-hand side of the machine looking at Fig. 1.

At the rear of the machine is a shaft 14. On this shaft are mounted a rocking arm 15, which operates, through connections hereinafter described, one side of the apron, and a rocking arm 16, which operates, through connections hereinafter described, the other side of the apron, and a rocking arm 17, which operates, through connections hereinafter described, the bunching-roller. The rocking arm 15 is operated by the roller 9 of the arm 8 bearing against a projection 18 on said rocking arm, this projection having a cam-surface, as clearly shown in Fig. 2. The rocking arm 16 is operated by the roller 13 on the arm 12 striking against a projection 19 on said rocking arm, said projection having also a cam-surface, as clearly shown in Fig. 3.

Figure 1:
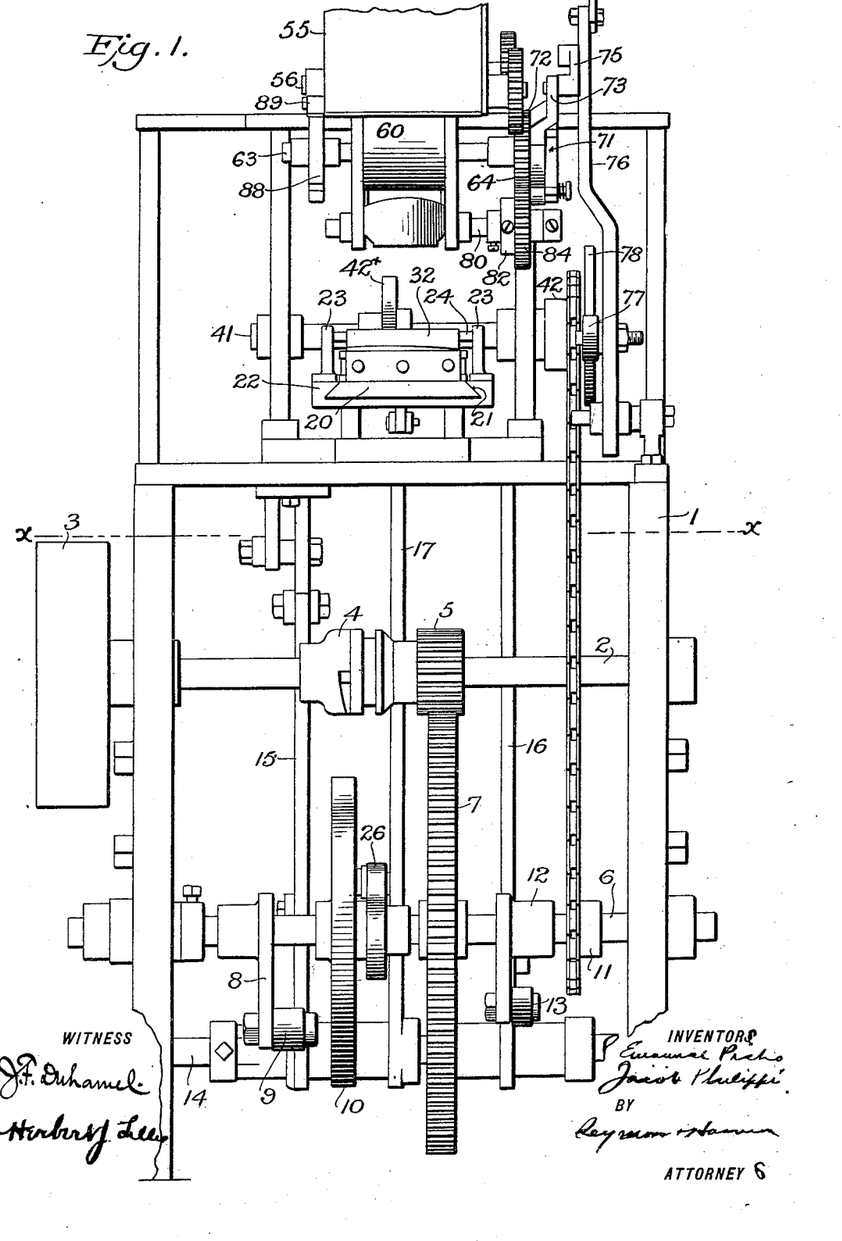
Figure 1 is a front view of the machine, the upper portion of the hopper being broken away.

On the bed of the machine is mounted a table 20, having its edges beveled, as shown at 21, Fig. 1. These beveled edges form the ways for a sliding frame 22, carrying uprights 23, which uprights support the bunching-roller 24. The bottom of this sliding frame is connected by any suitable means to a connecting-rod 25, the other end of said rod being connected to the upper end of the rocking lever 17, as shown in the plan view of Fig. 4 and in the view shown in Fig. 3. Attached to this rocking arm 17 is a lever 26, carrying a pin 27, which engages a cam-groove 28 of the cam 10. The other end of this rod is slotted, as shown at 29, and through this slot passes the shaft 6. By this described mechanism the revolution of the cam will cause the bunching-roller to slide back and forth over the surface of the table. At the rear end of the table are guides 30. Arranged to slide on the top of guides 30 is a carriage 31 in the form of a right angle, to which carriage the rear end of apron 32 is attached by any suitable device. As shown, this device consists of a plate secured to the carriage by screws, the end of the apron being between the plate and the carriage. Attached to this carriage are two guide-rods 33, passing through the guides 30. These guides are connected by a cross-piece 34. Attached to said cross-piece is a rod 35, carrying at its end a roller 40. Attached to the carriage 31 is a rod 37, which passes through a cross-piece 38, running from one to the other of the guides 30. Surrounding this rod 37 is a coiled spring 39, one end of which bears against the cross-piece 38.

Figure 3:
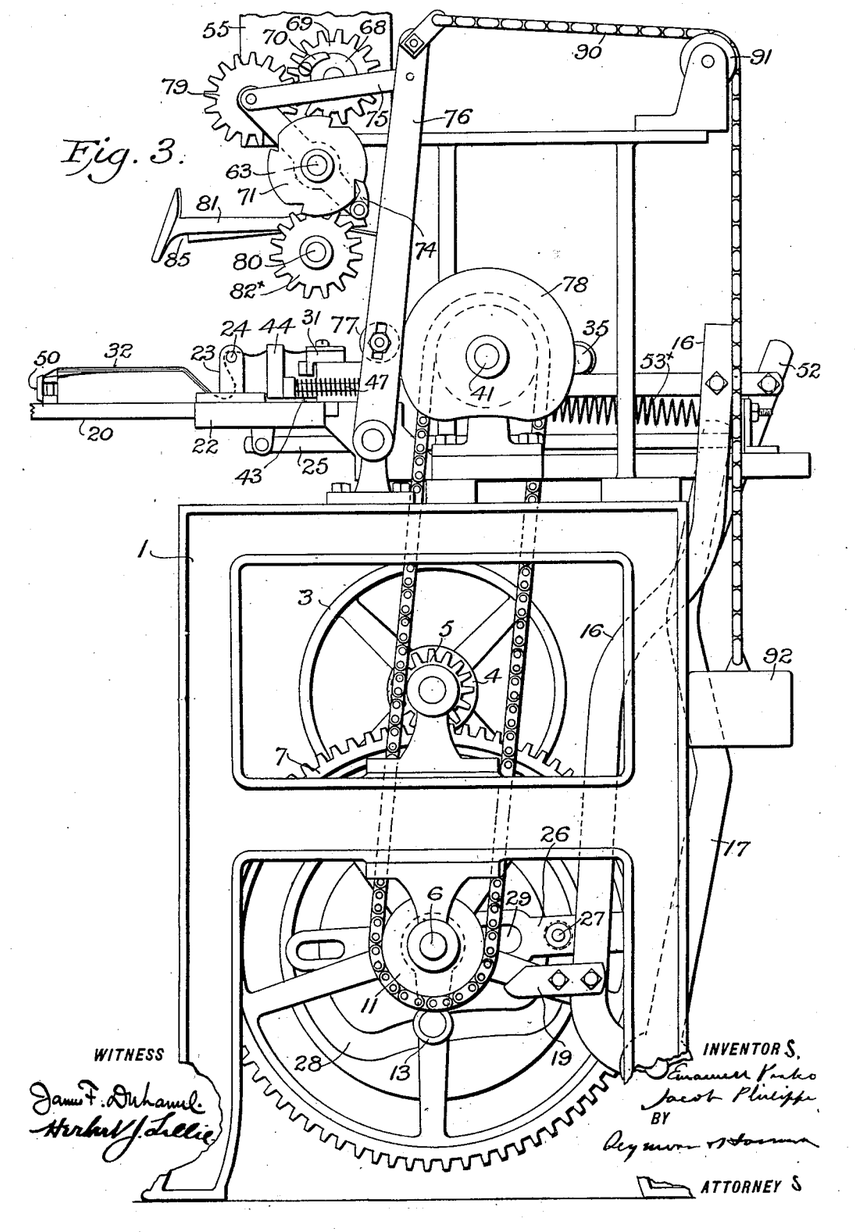
Fig. 3 is a view in elevation of the opposite side of the machine.
Figure 4:
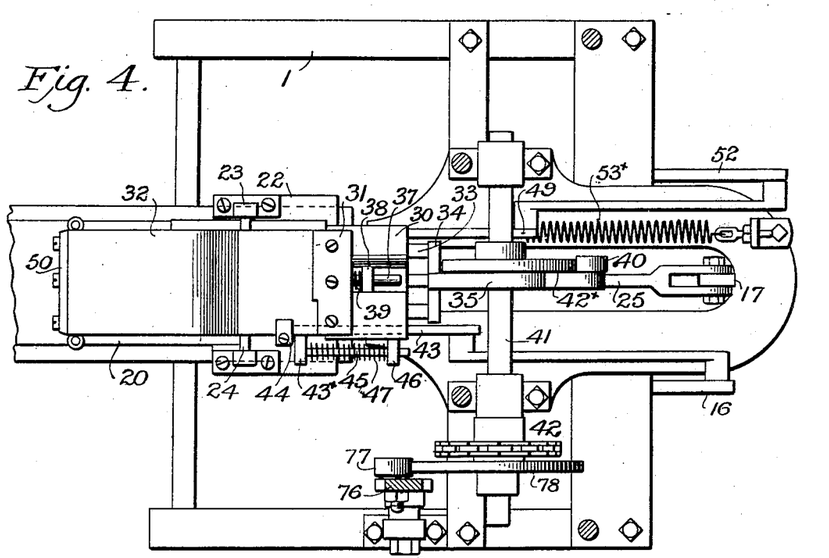
Fig. 4 is a plan view, the hopper and feeding devices being removed.
Figure 5:
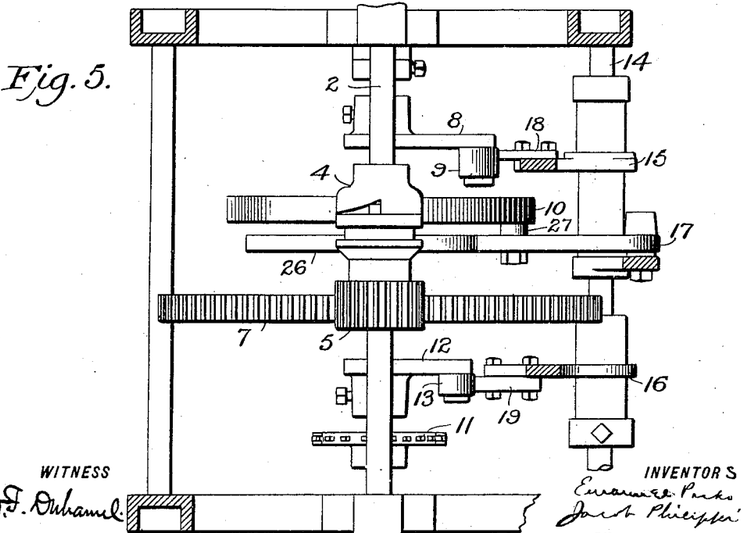
Fig. 5 is a horizontal section taken on the line $x\,x$ of Fig. 1, showing the actuating-gear, cams, &c., at the bottom of the machine.
Figure 13:
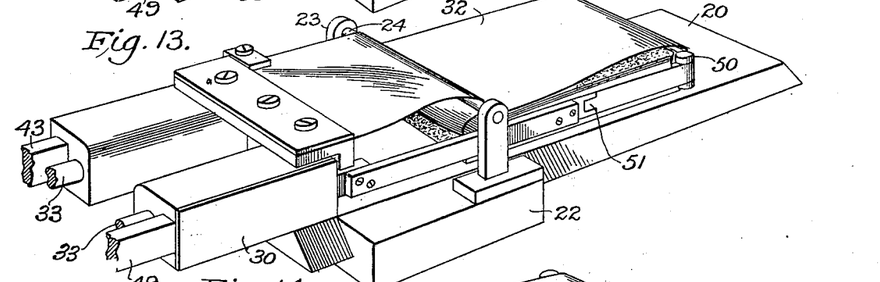

Across the top of the machine is a shaft 41, which carries a sprocket-wheel 42, the said shaft receiving its motion from the sprocket-wheel 11 on the shaft 6, which is clearly indicated in Fig. 3. On this shaft 41 is a cam $42^\times$, which bears against the roller 40 on the rod 35. By this mechanism as the shaft 41 revolves the cam $42^\times$ will force back the carriage 31, thus moving backward the end of the apron, the purpose of which will be more fully described hereinafter. Passing through one of the guides 30 is a rod 43, the forward end of which carries a clamping device 44, constructed to grip one edge of the apron, as clearly shown in Fig. 13. The rear end of this rod is attached to the rocking arm 16.

Attached to the rod 43 is a projection $43^\times$, having attached thereto a rod 45. On one of the guides 30 is attached an ear 46. Around the rod 45 is a coiled spring 47, bearing at one end against the ear 46 and at the other end against the projection $43^\times$. By this mechanism on the rotation of the power-shaft the arm 12, carrying the roller 13, will by the action of said roller against the cam projection 18 cause the rocking arm 16 to move backward, thus tightening that side of the apron gripped by the part 44, at the same time compressing the spring 47. Consequently on the further motion of the cam said spring will move forward the rod 43, thus slacking the apron. On the other side of the table, passing through the other of the two guides 30, is a rod 49, the forward end being attached to a piece 50, which is pivoted on a vertical pivot to the forward part of the rolling-table, as clearly shown in Figs. 4, 9, and 15. This rod is suitably jointed at 51. The rear end of this rod is attached to a rocking arm 52, which is pivotally attached to the frame of the machine, as shown at 53. The lower end of this arm is attached by a short link 54 with the rocking arm 15. Consequently as the power-shaft rotates the roller 9 on the arm 8, bearing against the cam projection 18 on the rocking arm 15, will cause the rod 49 to be moved forward, thus moving forward and tightening the side of the belt opposite to that seized by the gripping device 44. Attached to the rod 49 is a spring $53^\times$, the other end of said spring being attached to the frame of the machine, as clearly shown in Figs. 2 and 4. The spring will therefore when the roller 9 has ceased to act on the projection 18 cause the rod and parts to assume the position shown in Fig. 2.

At the top of the frame of the machine is secured a hopper 55, which contains the tobacco. Through the lower part of this hopper runs a shaft 56, having thereon an agitator 57. On the end of this shaft (see Fig. 3) is fixed a ratchet-wheel 68. Loosely mounted on this shaft is a gear-wheel 69, said gear-wheel carrying a pawl 70.

Figures 6, 7, 8, 9, 10, 11:
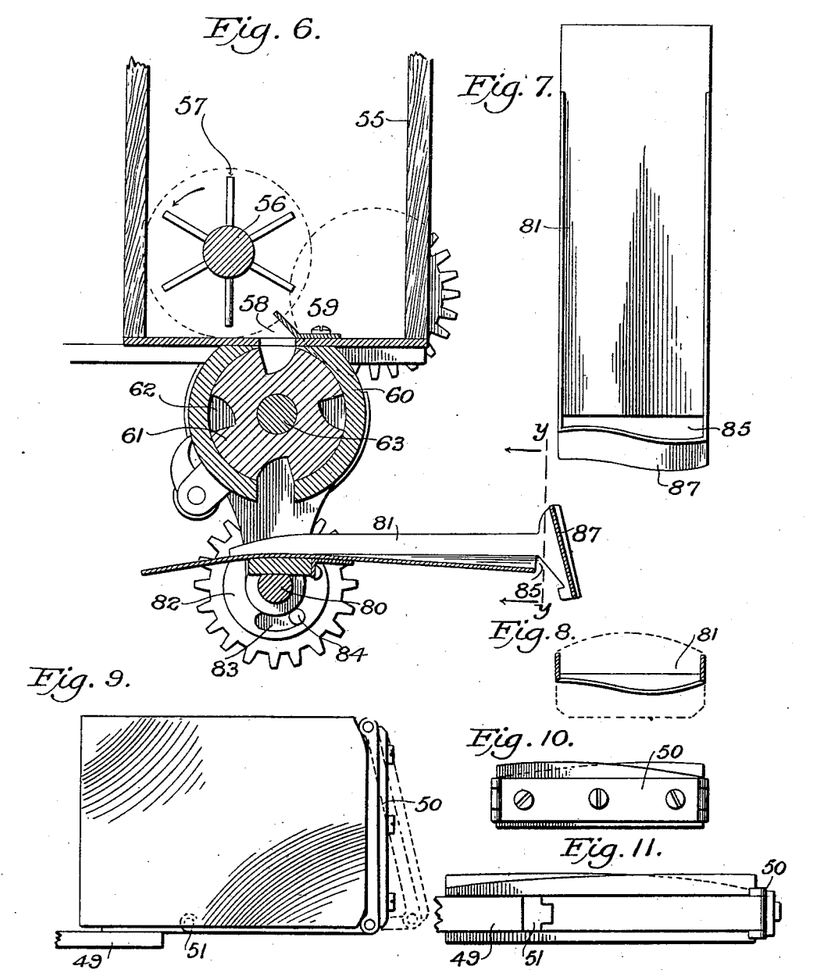
Fig. 6 is the vertical central section of the hopper and feeding device.
Fig. 7 is a plan view of the tilting feeding-trough.
Fig. 8 is a section taken on the line $y\,y$ of Fig. 6.
Fig. 9 is a plan view of the rolling-table, showing the pivoted piece to which the forward part of the apron is attached.
Figs. 10 and 11 are details of the same part of the mechanism.

In the bottom of the hopper is an orifice 58, and extending partly over the same a ledge or guard-plate 59. Directly below the hopper is a casing 60, cylindrical in form, having an opening above corresponding to the orifice through the bottom of the hopper and another opening diametrically opposite, as clearly shown in Fig. 6. Running through this casing is a shaft 63, which has mounted thereon a cylinder 61. This cylinder has on its periphery a series of pockets 62, each adapted for holding the requisite amount of tobacco for a single cigar or cigarette. On one end of this shaft is fixedly secured a ratchet-wheel 71, and loosely on the shaft a gear-wheel 72, to which is rigidly attached an arm 73, said arm carrying a pawl 74. To this arm 73 is attached a link or connecting-rod 75, the other end of which is attached to a rocking lever 76, mounted on the frame of the machine. This lever carries a roller 77, against which bears a cam 78, mounted on the shaft 41. To the lower end of the hopper is secured on a stub-shaft an idler gear-wheel 79, meshing with the gear-wheels 72 and 69. Below the hopper is mounted a shaft 80, which has secured to it the feeding-trough 81. On the outer end of this shaft is fixedly secured a disk 82, which is slotted, as shown at 83, Fig. 6. Loosely mounted on this shaft 80 is a gear-wheel $82^\times$. This gear-wheel has a pin 84, which projects into the slot 83. The feeding-trough 81 has substantially a flat bottom, with raised sides, as clearly shown in the various views. At the forward end is an orifice, as shown at 85. The forward boundary of this orifice is formed by a plate 87, curved, as shown in Fig. 7, in such a manner that as the loose tobacco passes through the slot it will assume, approximately, the shape of the cigar or cigarette desired. The curvature of this plate may be readily changed when different forms of cigars or cigarettes are to be made. On the other end of the shaft 63 is mounted a ratchet-disk 88 and on the hopper a dog 89. By this construction the motion of the feeding-cylinder is allowed in but one direction. To the upper end of the rocking arm 76 is attached a chain or cord 90, which runs over a pulley 91 at the rear of the machine. To the end of this chain is attached a weight 92, thus keeping the roller 77 at all times against the cam 78.

Figure 12:
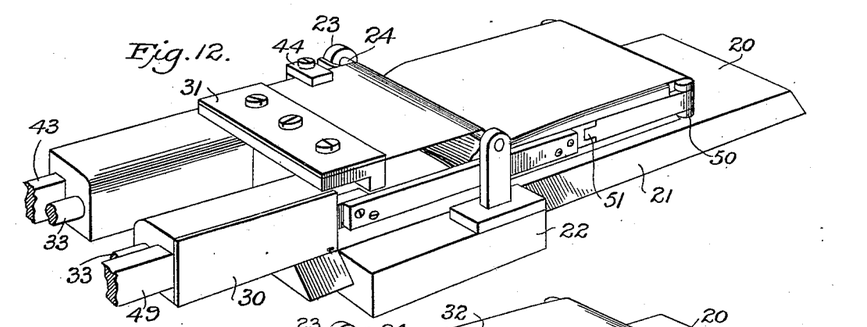
Figs. 12, 13, 14, and 15 are perspective views showing the rolling-table and the position of the apron at the various stages of the operation.
Figure 14:
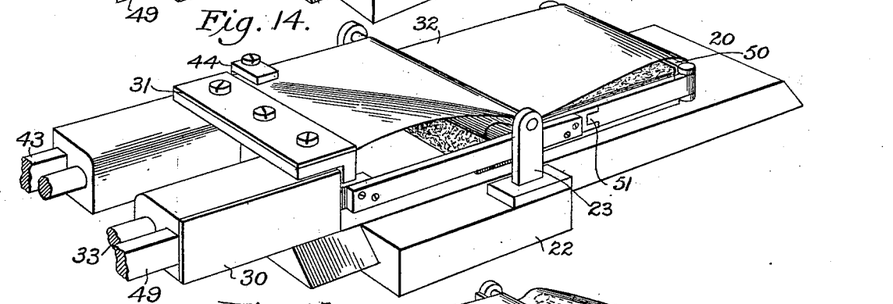
Figure 15:
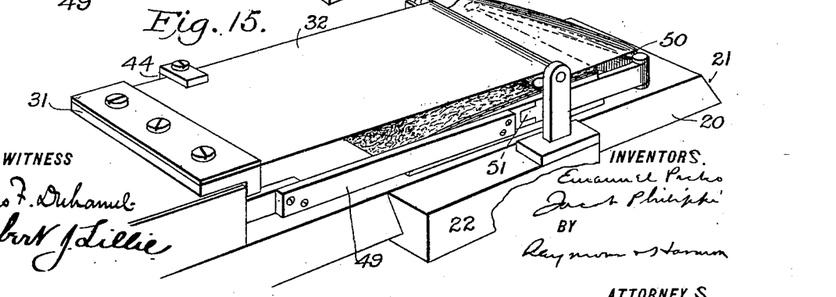
Figure 16:
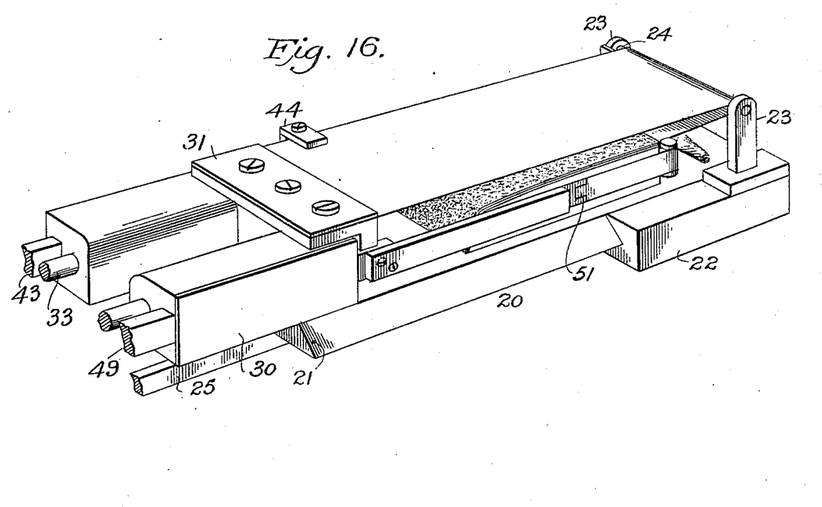
Fig. 16 is a view in perspective, showing the position of the table and its connections at the end of the operation.

The operation of the machine is as follows: In the position shown in Fig. 3 the charge of tobacco has just been dropped into the feeding-trough 81, the arm 76 being at the forward limit of its movement. The further rotation of the cam will produce no motion until the reduced portion of the cam bears against the roller 77, when the weight will force the arm 76 backward and through its connections move the gear-wheel 72 to the right looking at Fig. 3. The pawl 74 will travel over the surface of the ratchet-wheel 71 without producing any motion until the said pawl drops into the next notch, which it does at the extreme rearward position of the arm 76. Meanwhile this gear-wheel through the idler 79 has caused a partial rotation of the ratchet-wheel 68, and consequently of the agitator. This agitator moving in the direction of the arrow, as shown in Fig. 6, stirs up the tobacco and causes by co-operation of the plate 59 a charge to be forced into the pocket 62 of the feed-wheel. The gear-wheel $82^\times$ has by this motion been caused to turn to the left looking at Fig. 3 and as the pin 84 brings up against the end of the slot 83 causes the trough 81 to tilt downwardly, thus depositing the charge in the pocket of the apron, as shown in dotted lines, Fig. 3. As the arm 76 starts forward again the reverse of this motion takes place, the feeding-cylinder being moved to bring its filled pocket in position to dump its discharge. The trough 81 has raised to the position shown in Fig. 3, the motions being so timed that the charge is dropped from the feeding-cylinder as the trough reaches its horizontal position. The operative parts are then in the position shown in Fig. 3, and the operation is ready to be repeated. The cam 10 is now in a position to move the pin 27, engaging in the slot thereof, and cause the rocking arm 17 to move forward, thus causing the bunching-roller to move forward, which motion is continued until the pocket is closed. The shape of the cam is such that the bunching-roller is not at that time moved any further, but remains in a position holding the pocket closed, as shown in Fig. 12. The cam $42^\times$ now bears against the roller 40 on the arm 35 and through the described connections draws back the carriage 31, thus tightening the rear end of the apron and causing the said apron to be drawn tightly around the tobacco in the pocket, the binder and wrapper having been previously laid on the table in the ordinary manner. The roller 13 on the arm 12 now bears against the projection 19 on the rocking arm 16 and causes said arm to move backward and through the described connections—namely, the rod 43 and gripping device 44—pulls back quickly and sharply that side of the apron held by said gripping device. This sharp motion forms what is known as the "tuck." By the term "tuck" we mean not merely shaping that end of the cigar known as the "tuck end," but that the binder and wrapper are tucked or twisted together and around the filler, or, in other words, a very small portion of the cigar is actually rolled or formed. This motion also causes the pocket to assume a tapering form, the smaller end being on the same side with the gripping device, Fig. 13. The bunching-roller now moves across the table, and as the tuck has been formed before such motion is made and as the amount of tobacco increases from the end to the center of the cigar the tobacco cannot work out through the end, but is in a manner wedged therein. The motion of the roller across the table rolls up the binder, wrapper, and filler in a form which tapers from the edge of the apron toward the center. Meanwhile the rocking arm 16 and its connections move forward gradually by force of the spring 47, Figs. 14 and 15, thus gradually releasing the tension on that side of the apron, allowing it to become slack in the rear of the bunching-roller. As the bunching-roller continues to move, the roller 13 on the arm 12 comes in contact with the projection 18 on the rocking arm 15, and, through the described connections, causes the rod 49 to move forward, thus causing the pivoted piece 50 to swing out and tauten that side of the apron, as shown in Fig. 15. Thus as the bunching-roller continues to move it will roll a cigar in a tapering shape from the center to the edge, and it will be seen that the motion of this pivoted part is such that the strain on the apron increases from the center toward the edge, thus causing the same degree of pressure on all parts of the cigar being rolled notwithstanding the fact that the amount of tobacco therein decreases. When the cigar has been fully rolled, the roller 9 passes out of contact with the projection 18 on the rocking arm 15, and the pivoted part 50 is returned to its normal position by force of the spring 53, and the bunching-roller continuing its travel reaches the position shown in Fig. 16 and the cigar is dropped on the table. The shape of the cam 42 is such that at this moment the pull on the carriage 31 is released and said carriage moves forward by force of the spring 39, slacking up the apron. The bunching-roller returns to its normal position at the rear end of the table, the parts being then in the position shown in Fig. 3.

By this described mechanism a complete cigar of the double-tapering form ready to be smoked is made automatically without the necessity for the use of molds and without any specially-formed bunching-roller, table, or apron, the shape of the cigar being given entirely by manipulation of the apron itself and the pressure on the cigar being rolled being uniform from one end to the other.

In practice we prefer to cover our rolling-table with a soft yielding cover, as we find this produces better results. It will be seen that by our form of feeding device no mold or shaper is necessary for the filler other than the orifice through the tilting feeding-trough, also that each charge before it is dumped into the pocket is in plain sight of the operator, and thus the absence of the proper amount of filler or the presence of impurities therein is easily detected. It will be obvious also that various changes may be made in the various mechanical devices for operating the different parts of my machine—as, for instance, all motions may be made positive instead of employing springs and weights.

So far as the bunching-roller, the apron, and the rolling-table are concerned, they do not differ from those ordinarily in use, and by simply disconnecting the devices for tightening the apron the machine can be used for rolling the ordinary cylindrical cigarette, or by disconnecting the tightening devices on one side cigarettes or cheroots of a tapering form can be rolled, and it is possible to roll cigarettes of any desired form by simply adjusting or varying the times at which the various cams operate. Thus we form automatically a double-tapering cigarette without the use of molds or specially-prepared forms of table and roller by simply manipulating the apron of what is otherwise a well-known rolling device. The resultant product is an article whose quality as regards tightness of rolling, amount of filler, &c., is invariable.

In speaking of our way of forming a cigar tapering at each end by manipulating the apron we use the term "positively manipulating." By this we mean that the strain is placed on the apron by pulling directly on said apron independently of any action of the rolling mechanism and without in any way changing the relative position of the parts of the rolling mechanism, so that we can use said rolling mechanism for ordinary work with no change save disconnecting the apron-pulling devices.

The ledge or plate 87, which forms the forward boundary of the feeding-orifice in the tilting feeding-trough, we prefer to make of a flexible metal, so that the shape of the same can be altered readily by the fingers, thus enabling the operator to give any desired rough shape to the filler.

The above description is given for a machine used for making that type of cigar or cigarette in which a short filler, a binder, and a wrapper are rolled up together at one operation. It will be obvious that the bunch alone can be formed and the wrapper put on by hand, the shape of the bunch being given by the manipulation of the apron.

Although the described feeding device is only adapted for short fillers, the rolling mechanism can be used for any kind of cigar or cigarette, long or short filler, or it may be used for forming any kind of bunch of any desired shape, or it may be used for forming what is called a "Spanish bunch"—that is, one which consists of a shaped filler only.

What we claim, and desire to secure by Letters Patent, is—

1. In a machine for rolling a cigar tapering at each end, the combination of an apron, pocket forming and rolling mechanism, and means for manipulating the apron to shape the cigar, substantially as described.

2. In a machine for forming a cigar tapering at each end, the combination of the rolling-table, bunching-roller and apron, means for manipulating the apron to form first the tuck and then to give shape to the cigar, substantially as described.

3. In a machine for forming a cigar tapering at each end, the combination of the apron, pocket forming and rolling devices, of means for manipulating the apron to shape the cigar, and means for maintaining a uniform pressure throughout the extent of the cigar being rolled, substantially as described.

4. In a cigar-rolling machine, the combination of the apron, pocket forming and rolling mechanism, means for pulling taut one side of the apron to form the tuck, and means for pulling taut the other side of the apron to form the head, substantially as described.

5. In a machine for rolling a shaped cigar, the combination of the apron, pocket forming and rolling mechanism, means for pulling back one side of the apron to form the tuck and shape one end of the cigar, and means for pulling forward the other side of the apron to form the other end of the cigar, and means for maintaining a constant pressure on the cigar being rolled, substantially as described.

6. In a machine for rolling a shaped cigar, the combination of an apron, pocket forming and rolling mechanism and means for manipulating the apron to form the tuck, substantially as described.

7. In a machine for making cigars, the combination of the rolling-table, bunching-roller, and apron, means for pulling end of the apron backward, means for pulling back one side of the apron to form the tuck, means for slacking that side of the apron as the roller moves forward, and means for pulling forward the opposite side of the apron to form the head substantially as described.

8. In a machine for rolling cigars, the combination of the rolling-table, bunching-roller, and apron, means for feeding the filler to the pocket of the apron, means for moving the roller to close the pocket, means for moving the end of the apron backward to tighten the pocket around the tobacco, means for pulling back one side of the apron to form the tuck, means for slacking up that side as the roller moves over the table, means for pulling forward the other side of the apron to form the head, substantially as described.

9. In a device for feeding tobacco, the combination of the hopper, means for discharging tobacco therefrom, a tilting feeding-trough, having an orifice at the forward end thereof, the forward boundary of said orifice being composed of a ledge or rim shaped to cause the tobacco passing through said orifice to assume approximately the form of the finished cigar, and means for operating said trough, substantially as described.

10. In a cigar-rolling machine, the combination of an apron, pocket forming and rolling mechanism and means for positively tightening one side and then the other of the apron, substantially as described.

11. In a cigar-rolling machine, the combination of the table, roller and apron, means for pulling back one side of the apron to form the tuck, means for moving the roller across the table, means for pulling forward the other side of the apron to form the head, and means for maintaining a constant pressure upon the cigar being rolled substantially as described.

12. In a cigar-rolling machine, the combination of the table, roller, and apron, means for moving the roller forward to close the pocket, means for pulling back one side of the apron to form the tuck, means for causing the roller to pass over the table, means for pulling forward the other side of the apron to form the head, and means for slacking the part of the apron previously hauled taut, whereby a constant pressure is maintained on the cigar being rolled.

13. The combination of the table, roller, and apron, means for causing the roller to pass over the table, a gripping device at one side of the apron, means for causing the same to be moved backward at the beginning of the operation to form the tuck and shape one end of the cigar, a gripping device for the other side of the apron, and means for causing the same to move forward to shape the other end of the cigar, substantially as described.

14. The combination of the table, roller and apron, means for pulling back one side of the apron to form one tapering end, means for gradually relieving the strain as the roller passes over the table, until the largest diameter of the cigar is rolled, means for gradually tightening the other side of the apron as the roller passes farther over the table, whereby the other tapering end is rolled, substantially as described.

15. In a machine for rolling cigars, the combination of the table, bunching-roller, and apron, the gripping device attached to one side of the apron in rear of the roller, means for causing it to move backward, a part at the forward end of the table pivoted to swing in a horizontal plane, the front end of the apron being attached to said part, and means for moving the pivoted piece forward, substantially as described.

16. In a feeding device for cigar or cigarette machines, the combination of the hopper, having an orifice in the bottom thereof, feeding device below said orifice, an agitator mounted to rotate in said hopper, a guard-plate extending partly over said orifice in the bottom of said hopper, whereby the rotation of the agitator causes the tobacco to be forced into the feeding device, substantially as described.

17. In a cigar-machine, the combination of the apron and rolling mechanism, of a carriage, means for attachment of the end of the apron thereto, guides on which said carriage travels, rods connected to said carriage and passing through said guides, and operative mechanism connected to said rods for giving motion to the carriage.

18. In a machine for rolling a cigar tapering at each end, the combination of an apron, pocket forming and rolling mechanism, and means for manipulating the apron to vary the shape of the pocket while the cigar is being rolled, substantially as described.

19. In a machine for rolling a cigar tapering at each end, the combination of an apron, pocket forming and rolling mechanism, means for pulling back one side of the apron and means for pulling forward the other side of the apron, substantially as described.

Signed at New York, in the county of New York and State of New York, this 10th day of October, A. D. 1898.

EMANUEL PISKO.
JACOB PHILIPPI.

Witnesses:
E. M. HARMON,
HERBERT J. LILLIE.